(12) United States Patent
Szumlic et al.

(10) Patent No.: US 6,254,116 B1
(45) Date of Patent: Jul. 3, 2001

(54) WHEELCHAIR ACCESSORY APPARATUS

(76) Inventors: Thomas S. Szumlic, 619 Luzon Ave., Tampa, FL (US) 33606; Janiece L. Gallagher, 5906 Suwanee Ave., Tampa, FL (US) 33604

(*) Notice: Subject to any disclaimer, the term of this patent is extended or adjusted under 35 U.S.C. 154(b) by 0 days.

(21) Appl. No.: 08/491,124

(22) Filed: Jun. 16, 1995

(51) Int. Cl.[7] ............................................. B62J 11/00
(52) U.S. Cl. ................... 280/304.1; 224/407; 248/279.1
(58) Field of Search .......................... 280/304.1, 304.5, 280/32.5, 250.1, 202; 248/279.1, 274.1, 539; 297/174, 161; 224/407, 409, 411, 908; D12/131, 133

(56) References Cited

U.S. PATENT DOCUMENTS

| | | | |
|---|---|---|---|
| 3,929,309 | * 12/1975 | De Vore | 248/279.1 |
| 4,249,712 | * 2/1981 | Delong | 248/279.1 |
| 4,458,870 | * 7/1984 | Duncan et al. | 248/279.1 |
| 4,566,732 | * 1/1986 | Ostergaard et al. | 297/174 |
| 5,294,027 | * 3/1994 | Plastina | 224/407 |
| 5,516,021 | * 5/1996 | Douglass | 224/407 |

FOREIGN PATENT DOCUMENTS

1122256 * 9/1956 (FR) ................................. 248/279

* cited by examiner

Primary Examiner—Anne Marie Boehler
(74) Attorney, Agent, or Firm—Charles E. Lykes, Jr., Esq.

(57) ABSTRACT

An accessory mount for a wheelchair which further comprises a stably mounted telescoping shaft, a gripping arm at the top of the telescoping shaft which is adapted to be easily handled by a wheelchair-bound person and facilitate the angular disposition of a variety of accessory mounts, such as umbrellas, cameras, book stands, and the like.

4 Claims, 5 Drawing Sheets

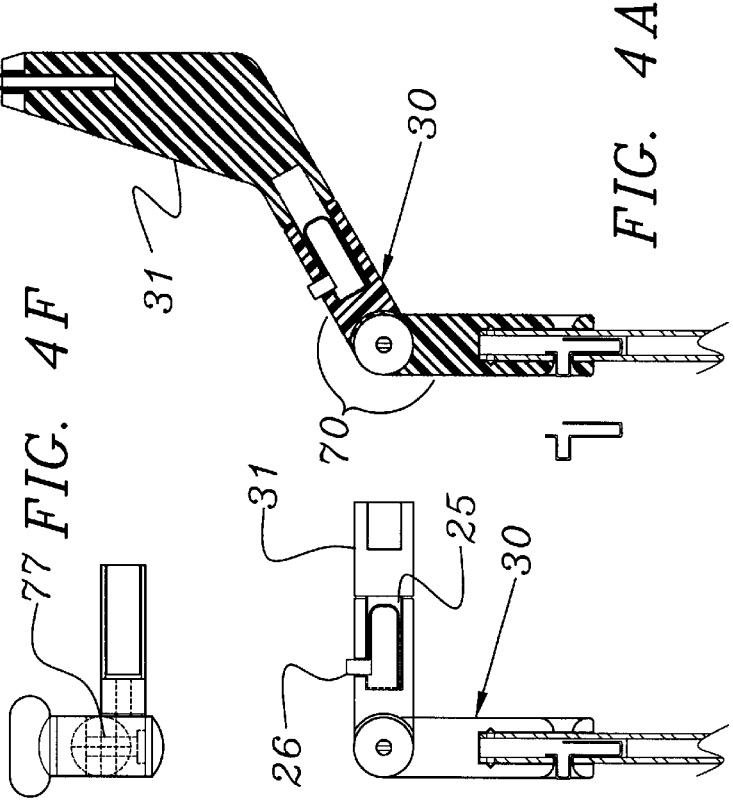
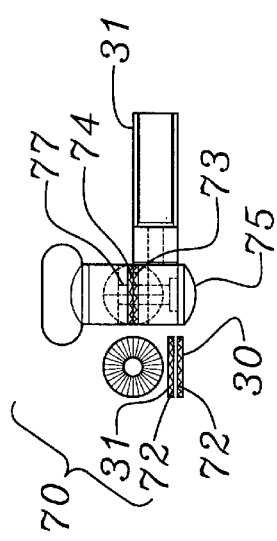
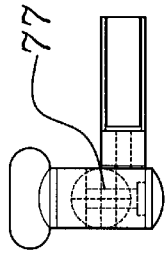
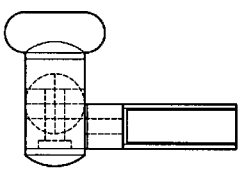
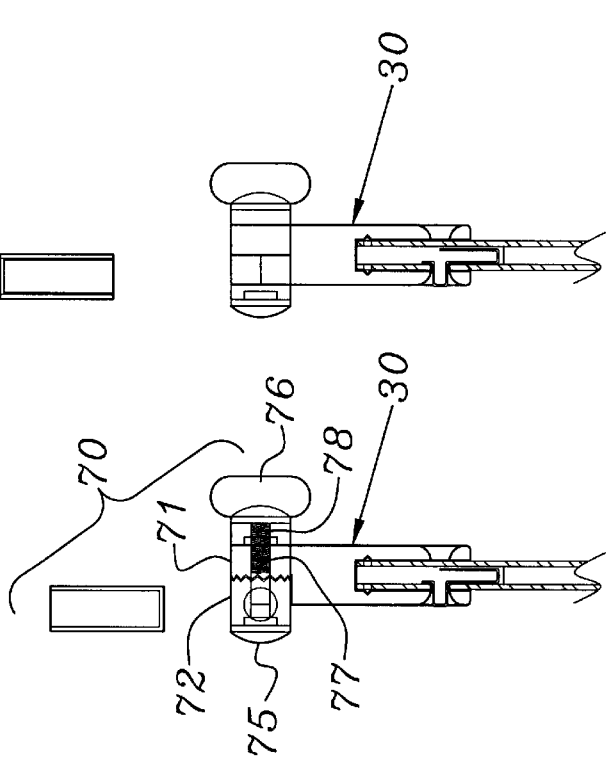

ically challenged, wheelchair-bound persons. The intent was to develop and provide an apparatus to maximize the protection and activity options available to a wheelchair-bound person given the fact that they will likely have sufficient range of return to propel the chair but not much more. As will be shown in this invention, the adjustments and opera-

WHEELCHAIR ACCESSORY APPARATUS

FIELD OF THE INVENTION

The invention relates to devices which are helpful in allowing persons confined to wheelchairs the ability to perform a variety of recreational activities. Reference is made to Disclosure Documents No. 369535 and 369590, filed by the Inventors on Feb. 13, 1995.

BACKGROUND OF THE INVENTION

Many persons are confined to wheelchairs who have substantial upper body mobility and function and desire to participate and perform a variety of productive and recreational tasks. Such tasks could include photography, astronomy, artistry, or any number of other upper-body dominant activities.

In addition to the obvious handicap of having diminished use of the legs, wheelchair-bound persons are restricted by having to always have one or more hands free to move or control the wheelchair. Wheelchair assemblies are often so cumbersome as to prevent the installation of accessories which could facilitate such activities.

Physically challenged, wheelchair-bound persons are predominantly quadriplegics. Those who are able to propel themselves in wheelchairs, however, normally have at least sufficient range of return with their hands to grip and propel the wheels of a wheelchair. Additionally, wheelchair-bound persons are particularly vulnerable to the elements because of the extra work and coordination necessary to install and maintain protective gear, such as umbrellas.

Previous efforts have been made to solve these problems. U.S. Pat. No. 5,040,813, issued to Cumbie on Aug. 20, 1991, teaches a two-part frame assembly. The apparatus taught by Cumbie includes a two-piece frame member upon which is rigidly mounted some form of accessory apparatus. The two-part mount houses a rigid shaft which is apparently free to swivel about an axis of rotation. The invalid person can put accessories on an arm which is mounted to this shaft, but will experience difficulty in turning around. A more accessible arrangement is needed..

U.S. Pat. No. 5,180,181, issued to Letechipia on Jan. 19, 1993, teaches a pouch for carrying accessories. This pouch is to be housed immediately behind the wheelchair seat. Accordingly, the wheelchair-bound patient could have access to materials within the pouch by swiveling it out from behind to alongside him. This is a helpful device for providing access to wheelchair accessories, but does not realistically facilitate working with them because it does not put them in a position facilitating their use.

U.S. Pat. No. 5,246,240, issued to Romich, et al, on Sep. 21, 1993, provides another version of wheelchair assembly. Rather than be mounted on a shaft extending alongside the wheelchair (as in Cumbie), Romich teaches an arm which is mounted upon one of the armrests of the wheelchair. This is accomplished by providing a clamp which can be securely tightened about a tubular armrest from which an arm is free to swing from a position alongside a wheelchair-bound person to a position generally in front of the patient.

U.S. Pat. No. 5,168,889, issued to Diestel on Dec. 8, 1992, exemplifies the problems inherent in much of this art. Diestel teaches an overhead cover which is mounted behind the wheelchair-bound person (meaning that such person would have to turn around and pull to install or remove it) and is capable of only one function, that of covering.

These devices collectively lack several key features which would be most helpful to an invalid person. First is that, once installed, each of these devices has virtually no range of vertical or horizontal motion. Accordingly, certain activities may require protection above or an accessory at eye level, or an accessory below eye level. Accordingly, vertical adjustability and angular, or positional, adjustability of an accessory mount would be a most useful element.

Secondly, each of these devices are adapted with one or more complicated adjustments to be made. These adjustments include manipulation of adjusting screws and levers with tools or with the ability to tighten them to some substantial extent. This is an activity which would be difficult for an invalid person to carry out, even one with upper-body motion. The presumption here is that a number of these invalid persons will also have some loss of use of their upper bodies or will be elderly to the extent that arthritis or other maladies inhibits their ability to perform tasks requiring a great deal of manual dexterity.

It would, then, be useful to provide such a wheelchair accessory which could overcome these problems. What is not provided in the prior art is such a wheelchair accessory apparatus which allows permanent installation of a solid accessory mount which does not interfere with wheelchair mobility and is adapted to be operated by a wheelchair bound person who may suffer from other disabilities.

SUMMARY OF THE INVENTION

The Inventors have solved many of the problems inherent in the present art by providing a wheelchair mount which, once installed, provides a wheelchair-bound person with a multi-purpose mount with the ability to adjust it within a vertical range necessary to accomplish a variety of tasks. The apparatus can be allowed to freely swing or it can be locked into any number of useful orientations.

The adjusting mechanisms are all designed to facilitate easy grasping and maneuvering, and the accessory mounts can be made to incorporate the standard industry features. This is meant to facilitate permanent installation of a stable base and easy handling by a wheelchair bound person.

This is done by providing a wheelchair side mount which is very solid and rigid and which has as a base member a solid tubular container shaft which will provide a steady and reliable base. Within this base member is a telescoping member, also constructed of a solid material and with sufficient structural integrity to bear and allow the manipulation of a variety of accessories, perhaps even multiple accessories, with stability and ease. The telescoping member are further adapted with an easy means of adjusting the height and degree of swivel so that it can be easily locked into an appropriate orientation and dependably remain in place.

At the top of the telescoping member is provided a gripping arm. The gripping arm is also subject to minor adjustments but generally is angularly disposed and adjustable from the top of the telescoping mounting shaft. The gripping arm is further adapted to receive a variety of mounts and bases for standard accessories. These may include umbrellas, camera mounts, telescopes or binoculars, book holders, or other useful accessories.

The Inventors have solved the problems inherent in the prior art, then, by considering the condition of physically challenged, wheelchair-bound persons. The intent was to develop and provide an apparatus to maximize the protection and activity options available to a wheelchair-bound person given the fact that they will likely have sufficient range of return to propel the chair but not much more. As will be shown in this invention, the adjustments and operation of the system, once installed to the wheelchair, will be capable of performance by one whose range of return is at that level.

It is then an object of the present invention to provide means and apparatus for permitting the installation of convenient and easy to use accessories on a wheelchair.

It is a further object of the present invention to provide such an improved wheelchair accessory assembly which may be operated by a wheelchair-bound person with manual dexterity impairments.

It is a further object of the present invention to provide such an improved wheelchair accessory apparatus which can be operated by someone with only one hand free.

It is a further object of the present invention to provide such an improved wheelchair accessory apparatus which may be adapted to mount a variety of utilitarian and recreational accessories and will permit such accessories to be disposed in a variety of wheelchair orientations.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

FIGS. 4A through 4G depict the rotational swiveling operation of a telescoping upright shaft member together with the gripping arm.

Apparatus and means may be described herein which are not depicted by the accompanying drawings. Such means and apparatus, if described, should be considered part of the specification even if not so depicted by a figure or drawing.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
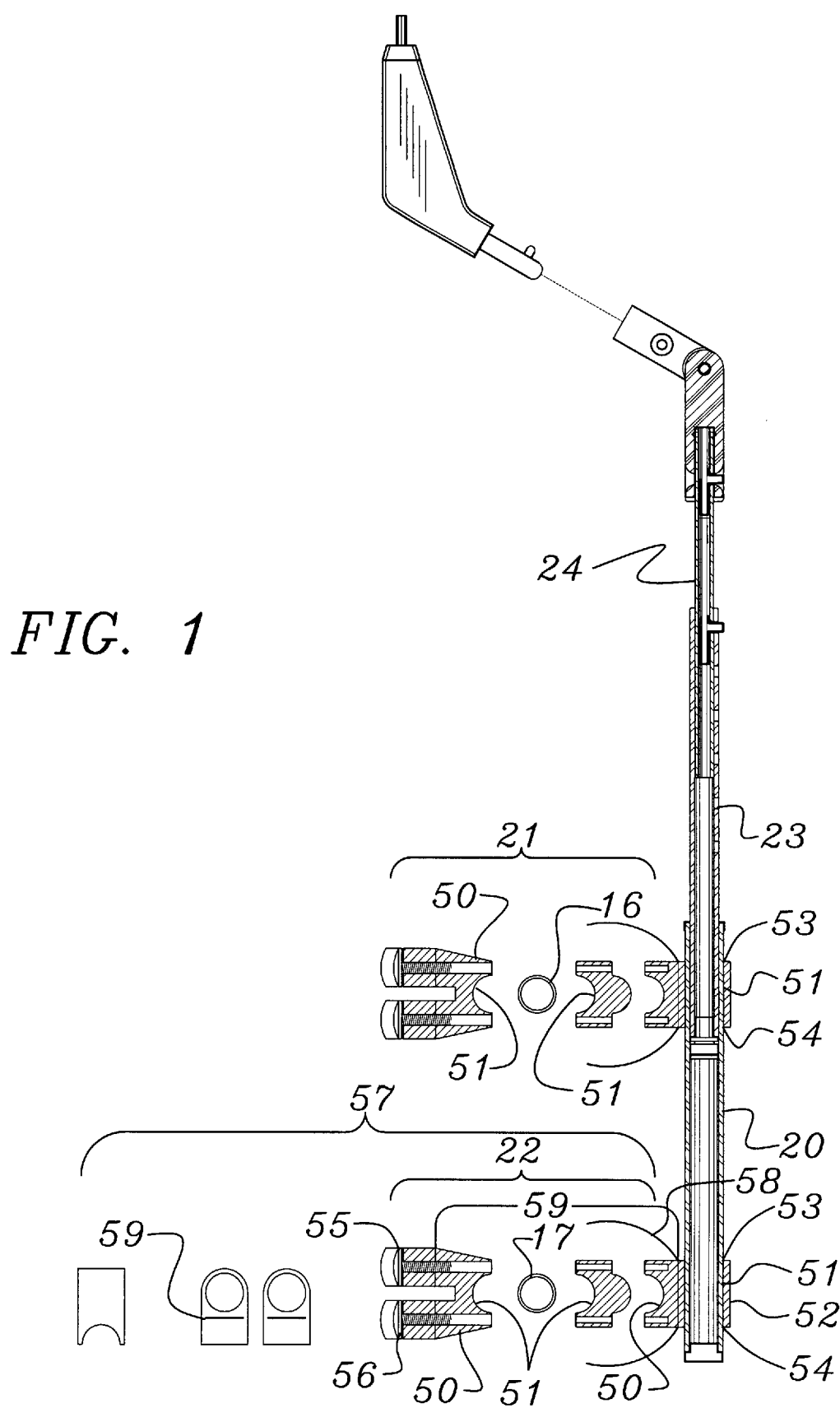
FIG. 1 is a diagram of the entire apparatus, apart from a wheelchair, in which the apparatus is used to mount an umbrella adapted for wheelchair use.
Figure 2:
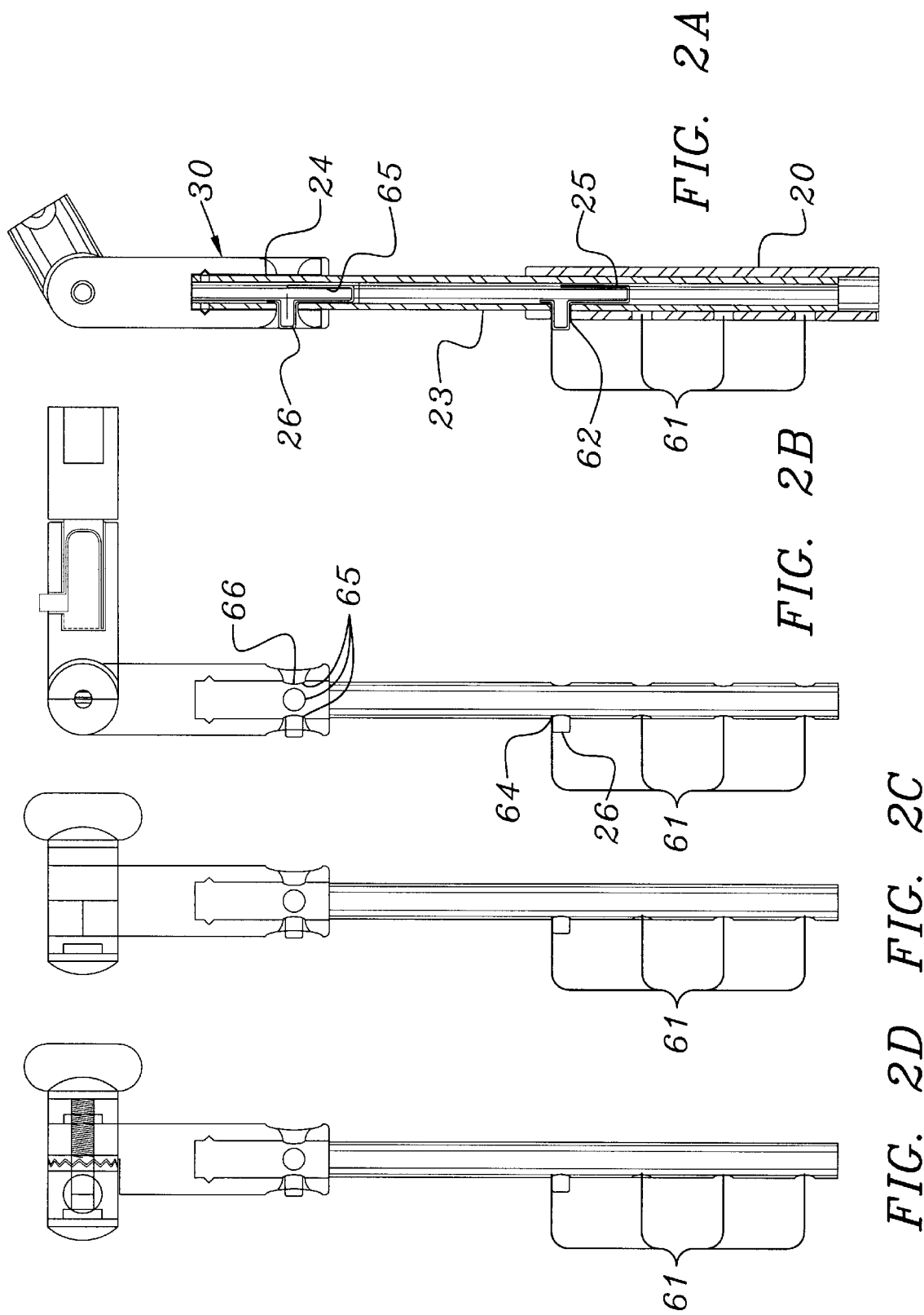
FIGS. 2A through 2D depict the operation of the vertical adjustment of the upright shaft assembly.
Figure 3:
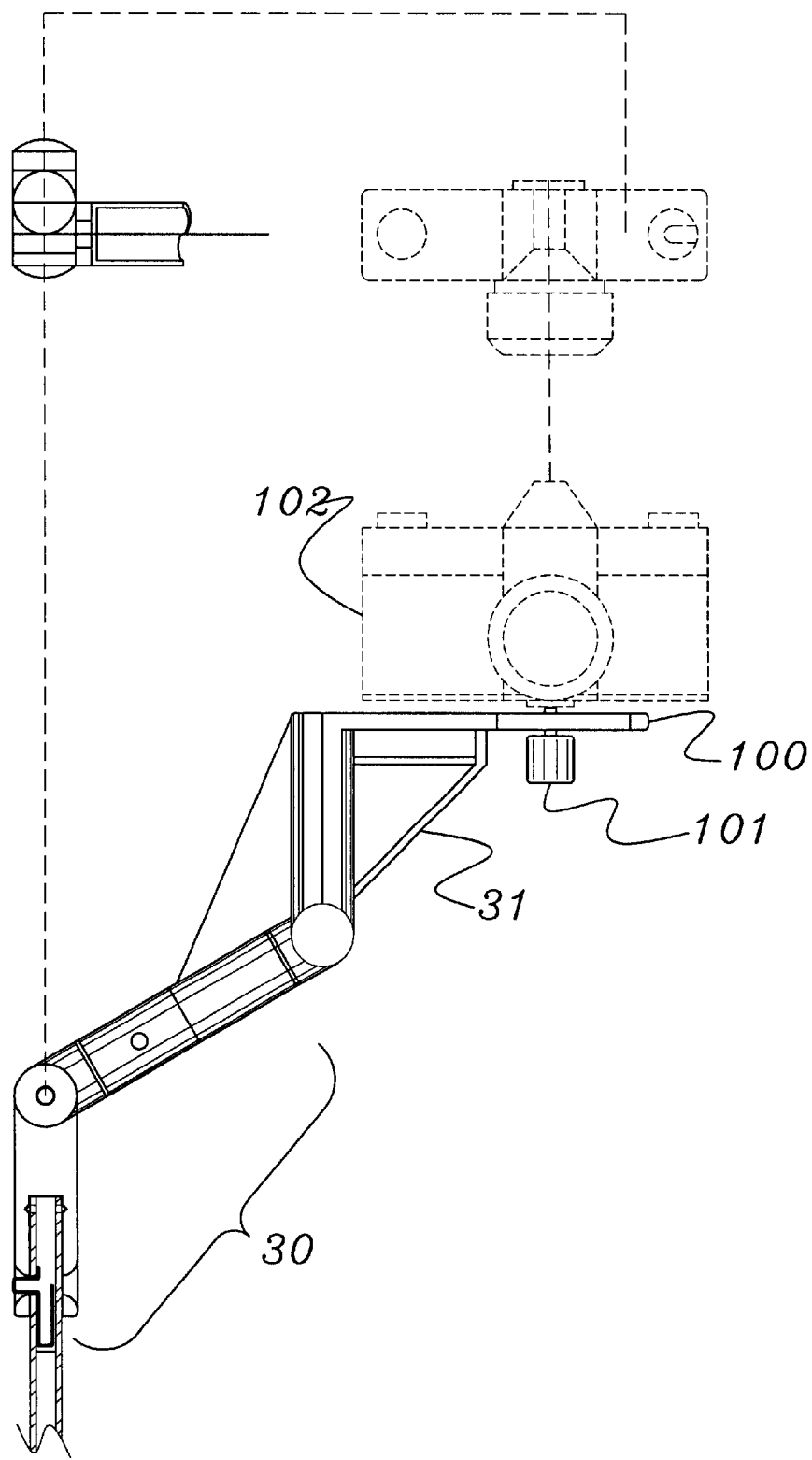
FIG. 3 depicts the top portion of such an apparatus which has been adapted to mount a camera.

Making reference first to FIG. 1, the principal components of the overall apparatus are depicted. It can be seen that a shaft base member (20) may be secured by an upper clamp member (21) and a lower clamp member (22). As will be seen in later figures, these clamps (21, 22) fit on a wheelchair (15) on upper (16) and lower (17) frame members, which are common to nearly all existing wheelchair models. Within the base member (20), may be snugly positioned a telescoping intermediate member (23). This member may be secured in position as desired. Within this first telescoping member (23) is snugly positioned an upper telescoping member (24). The upper telescoping member (24) may also be secured in a desired position.

While the preferred embodiment will be discussed in terms of an accessory mount with two telescoping members (23, 24), it will become clear that the invention could satisfactorily work with only one telescoping member, as long as it was sufficiently long and solid to supply the necessary accessory elevation and support. A single telescoping member should be considered as within the spirit and cope of the invention.

It should be noted at this point that the Inventors have considered that, to be truly useful, an apparatus should be designed which will work with virtually all wheelchairs. From reviewing the prior art it can be seen that many wheelchairs have armrests and many of the presently available inventions incorporate the armrest for either support or utility. There are, however, some wheelchair designs which do not include an armrest. Virtually all wheelchairs will have both upper and lower frame members. The lower frame member will generally be used to position the front or smaller wheels and may also be adapted to position and mount the larger rear wheels. The upper frame member will generally be available to support the seat of the wheelchair and may also be used for support of the rear wheel. The center of the rear wheel will normally be immediately behind or at the rear of the seat. This provides stability. This also results in the wheel grip being downwardly disposed at a point generally alongside the sitting wheelchair-bound person. This facilitates gripping and propelling the device.

The Inventors have considered that virtually all wheelchairs will have these upper and lower frame members which will generally be horizontal in order to devise a bracket arrangement which is suitable for universal use. A main bracket member (50) is adapted with a slot (51) for fitting a generally tubular frame member (16 or 17) and a holding slotted member (52) for cooperation with the main bracket (50) member and secure mounting upon either the upper (16) or lower (17) frame member of the wheelchair (15). Each of these two members (50, 52) has a cooperating tubular open end (53, 54) and partial cylindrical slot (51) to receive the upper (16) or lower (17) wheelchair frame member.

In order to accomplish the mounting, it is necessary to clamp these two members together on opposite sides of the wheelchair frame member. This could be done by the use of elongated screw members (55, 56) which pass by either the upper or lower sides of the frame member (16 or 17) and can be tightened down with sufficient force to hold the mounting bracket assembly (57) in place. Such a mounting bracket assembly (57) will be on both upper (16) and lower (17) frame members.

It should be considered, however, that straps (58) could also be used to strap the two members together by adapting each of the two members with at least two cooperating slots (59) which can receive a strap (58) which may be passed through a pair of slots (59) and fastened at its ends. The ends could be fastened with VELCRO(R), buckles, or any other means in which pliable and elongated materials may be fastened together. It also may be desirable to insert a spacer (110) into the mounting bracket assembly (57) in order to accommodate the design of a particular wheelchair.

It is anticipated that the mounting brackets (57) for holding the base shaft member will be permanently installed onto the wheelchair. Accordingly, the use of screws or high-tension straps here for these brackets may not be suitable for operation by a physically-challenged wheelchair-bound person. As will be shown throughout the remainder of the description of this preferred embodiment, the remaining adjustments and equipment modifications will be capable of application in that manner.

The upper (24) and first (23) telescoping members may be secured by the use of a spring-loaded button member (25) which could be simply engaged and disengaged even by a wheelchair-bound person with limited manual dexterity. Such will be described in greater detail later.

Resting upon and secured to the top (26) of the upper telescoping member (24) is a gripping arm (30) upon which may be housed a desired accessory mounting member (31). In FIG. 1, such mounting member is used to mount the shaft (32) of an elliptical umbrella (33). The elliptical umbrella (33) has generally elliptical area coverage (34) so as to allow the umbrella to fully cover a wheelchair-bound person without unnecessarily extending beyond either side of the wheelchair assembly (15) and still having its shaft (32) mounted at some distance away from the body of the covered person.

Various angular and vertical positioning adjustments are facilitated by a series of holes (61) along the base shaft member (20) which may be aligned with a hole (62) in the first telescoping shaft member (23). A spring-loaded button (25) could be attached to the enclosed telescoping shaft member (23) so that the button end (26) could protrude through the hole (62) in the first telescoping shaft member (23) which could be slid and twisted within the base shaft member (20) until the button end (26) aligned with a desired base shaft member hole (64). The button end (26) would then protrude through both holes (62, 64) and lock the shafts (20, 23) into place against each other. An example of such a spring loaded button is the VALCO (R) SNAP-BUTTON, B—SINGLE END—DOG LEG, which is available in a variety of sizes and spring tensions.

Similarly, another series of holes (65) could be provided radially around the first telescoping member (23) to be similarly aligned with a hole (66) and spring loaded button (25) within the upper telescoping member (24) in order to provide an angular positioning of the gripping arm (30). The same type spring loaded button (25) could also be used to secure the accessory mounting member (31) to the gripping arm (30), either with a radial series of holes (67) or a series of holes along a length of the gripping arm (not depicted), or both.

These various adjustments have been described and taught with spring loaded button and hole combinations because such may be operated with relative ease by one with the ability to simply grip and squeeze a bar or handle. It should be noted, however, that the apparatus may also be used with cotter pins which could be thrust through the desired alignment holes. The cotter pins could be attached to the desired shaft or member near the alignment hole with a string or line so that it would always be easily accessible. There are also cotter pins which are spring loaded and may be operated by pulling out from the outside.

Any other means in which concentric shaft members may be interlocked could be used. Each such method would be keeping within the spirit and scope of the present invention. What is pointed out as significant is that some shaft positional locking method should be incorporated which can be operated by one with limited range of return. This is so that, once the accessory mounting apparatus is mounted to the upper (16) and lower (17) wheelchair frame members, each and every adjustment may be easily made.

It can further be seen that the umbrella shaft (32) is fit within the accessory member (31) which is further attached to its gripping member with an adjustable angular clamp (generally, 70) which comprises a pair of radial series of wedges (71, 72). One such set of wedges (71) is generally within a plane (73) on the gripping member (30) and the other (72) is within a plane (74) which is on the accessory member (31). Such wedges (71, 72) permit the gripping member (31) to be locked into a sufficient number of discreet angular orientations to satisfy a wide variety of accessory needs and then clamped into place by a nut (75) and bolt (76) assembly.

Again, in order to facilitate easy operation by one with limited range of return, the bolt (76) could be embedded permanently within the gripping member (31) and protruding perpendicularly from the center of the radial wedges (71) and pass through a hole (77) at the center of the radial wedges (72) of the accessory member (31). The nut (75) could be an easily gripped and turned wing nut (75) and the threads (78) could be cut to facilitate easy leverage and tightening.

As further depicted in FIG. 4, it can be seen that such a radially wedged clamping member could be placed at either end of a gripping member to further enhance the ability to adjust angle and disposition of the gripping member. In FIG. 4, a camera is shown mounted at the end. It can be seen that reducing one angle would require increasing the other angle.

While the invention has taught such radial wedge clamp apparatus (70), it is again pointed out that a variety of known means of providing angular, planar clamping may be found within the mechanical arts. It is not the purpose of the present invention to describe or claim such means, but such means as may be applied to the present invention should be considered within the spirit and scope of the present invention.

It should also be noted that the multiple part gripping and mounting members afford an additional handling advantage. A wheelchair bound person will necessarily lose the leverage necessary to work with heavier objects. If necessary, the user could disassemble and reassemble the device one piece at a time with relative ease as each of the pieces fitting on the telescoping shaft and base gripping member are individually light and easy to work with. Accordingly, a person confined to a wheelchair would not be required to hold heavy weights, without support or leverage, for extended periods of time in order to install and position a given accessory once the base member and shaft assembly have been mounted to the wheelchair frame.

Figure 5:
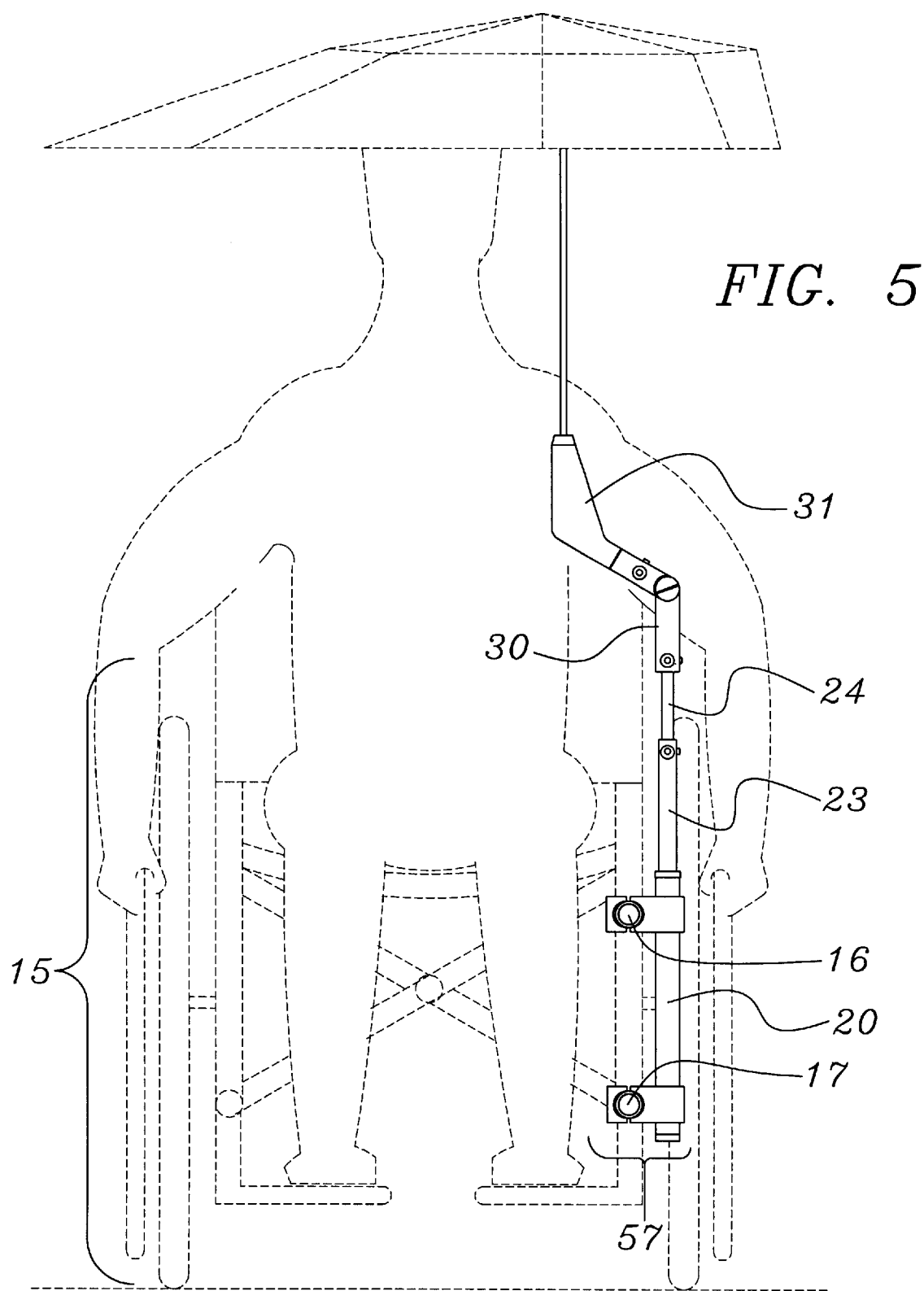
FIG. 5 depicts the apparatus mounted upon a wheelchair and suspending an umbrella above a wheelchair-bound person.

As has been shown, the gripping arm (30) is adapted to receive an accessory mount. It is anticipated that a variety of accessory mounts will be provided in order to accommodate a variety of accessories. These accessories could be tailored to assist a wheelchair-bound person in accomplishing a number of recreational and maintenance tasks. For instance, as has been depicted, an accessory mount for an umbrella could be provided. As is also depicted (please see FIG. 5), an accessory mount could be developed which would facilitate the mounting of a camera. Most cameras (including video cameras) are adapted with standard receiving threads for the protruding screw of a tripod. Accordingly, such a protruding screw could be provided on one of these accessory mounts to facilitate the mounting of a desired camera. The accessory mount for this would also include or be adapted to facilitate aiming and directing by the wheelchair-bound person.

Since the telescoping arm permits a wide range of vertical positioning, it is also true that other accessories could be used in conjunction with this apparatus. For instance, an accessory mount for a food tray could be provided. Additionally, a stand for holding a book, a mount for a painting easel, a table surface for playing board games such as chess or checkers, or any variety of devices for improving the condition of life and options available to the wheelchair-bound person could be used.

It is anticipated that a variety of required accessory mounts and accessory utensils could be carried along in a bag or a pouch which could be attached to the wheelchair in a position facilitating access by the wheelchair-bound person.

The apparatus is intended to permit and facilitate maximum independence of a wheelchair bound, physically challenged person by providing a wheelchair which offers a variety of simply installed accessory options. Care has been taken to ensure that the dimensions of the chair, with the accessories installed, does not significantly expand the dimensions of the chair, thus enabling it to fit within the entrances and exits and along the ramps as required by the Americans With Disabilities Act (ADA).

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. A wheelchair and apparatus for mounting and stabilizing any one of a variety of accessories to said wheelchair, the apparatus comprising:

a mounting means, said mounting means further comprising a mounting shaft which may be mounted to the frame of the wheelchair at a point along the side of the wheelchair and sufficiently forward of a wheel of the wheelchair to permit a person free access to the wheel and wheel-gripping member of the wheelchair, said mounting shaft further having one or more telescoping sections;

said one or more telescoping sections further having releasable fastening means adapted to enable said telescoping sections to be set and locked throughout a range of vertical motion, said vertical fastening means further comprising a series of exterior vertical positioning holes which are vertically positioned along an outer base shaft member and which are further adapted to be aligned with an interior vertical positioning hole within an enclosed shaft member of said telescoping sections, said enclosed shaft member further having a spring loaded button with a button end which may be pushed within said interior vertical positioning hole and is further adapted to align said spring loaded button and then allow said spring loaded button to be released so that its button end may spring up through said interior vertical positioning hole and a desired one of said exterior vertical positioning holes and lock said base shaft member and enclosed shaft member together at a desired point;

an uppermost shaft member of said telescoping sections having locking means adapted to permit said uppermost member to be securely locked within a range of rotation, said rotational locking means further comprising a rotational positioning hole within said enclosed shaft member which is adapted to align with one of a series of radial positioning holes which radially surround the uppermost shaft member enclosing the enclosed shaft member, said enclosed shaft member being further adapted with an additional spring loaded button with a button end which may be pushed within said rotational positioning hole and then released so that its button end may spring up through said rotational positioning hole and a desired one of said radial positioning holes and lock said uppermost shaft member and enclosed shaft member together at a desired point;

gripping means, said gripping means resting upon the uppermost shaft member of said telescoping sections and extending out through a range of angular dispositions including from perpendicular to said telescoping sections to nearly vertical from said uppermost telescoping shaft member, said gripping means further receiving accessory mounting means; and said accessory mounting means further being adapted to receive and mount an accessory which may be of use to a wheelchair bound person and is to be received by said accessory mounting means.

2. The wheelchair and apparatus described in claim 1 in which said gripping means is adapted to receive a mount for an umbrella.

3. The wheelchair and apparatus described in claim 1 in which said gripping means is adapted to receive a mount for a camera tripod surface apparatus.

4. The wheelchair and apparatus described in claim 1 in which said gripping means is adapted to receive a mount for a tray surface.

* * * * *